United States Patent [19]

Bailey

[11] 4,289,655
[45] Sep. 15, 1981

[54] MAGNETIC CATALYSTS AND THEIR PREPARATION

[75] Inventor: George W. Bailey, Baton, La.

[73] Assignee: Exxon Research & Engineering Co., Florham Park, N.J.

[21] Appl. No.: 153,408

[22] Filed: May 27, 1980

[51] Int. Cl.$^3$ .................. B01J 21/04; B01J 21/06; B01J 23/89
[52] U.S. Cl. ................ 252/466 B; 252/466 J; 252/472; 252/474; 34/1
[58] Field of Search ............. 252/455 R, 459, 466 J, 252/472, 62.59, 466 B, 474; 34/1, 10; 423/598

[56] References Cited

U.S. PATENT DOCUMENTS

| | | | |
|---|---|---|---|
| 1,219,277 | 3/1977 | Farup | 252/472 X |
| 3,892,897 | 7/1975 | Rittler | 252/472 X |
| 4,115,927 | 9/1978 | Rosensweig | 34/1 |

FOREIGN PATENT DOCUMENTS 49-44238  11/1974  Japan .................. 252/62.59

Primary Examiner—W. J. Shine
Attorney, Agent, or Firm—Llewellyn A. Proctor

[57] ABSTRACT

A process wherein a magnetic iron precursor component characterized as the mineral ilmenite, $FeTiO_3$, particularly the natural mineral ilmenite, $FeTiO_3$, is incorporated within a refractory inorganic oxide particulate mass, notably alumina, silica, silica-alumina, aluminosilicate or precursor thereof, which serves as a matrix. The mineral can be prereduced and then formed into a composite, or said mineral can be dispersed as an inclusion, or inclusions, and the particulate composite mass then treated in a reducing atmosphere to form oriented, laminar layers of reduced iron metal intimately dispersed throughout said particulate composite mass.

15 Claims, 1 Drawing Figure

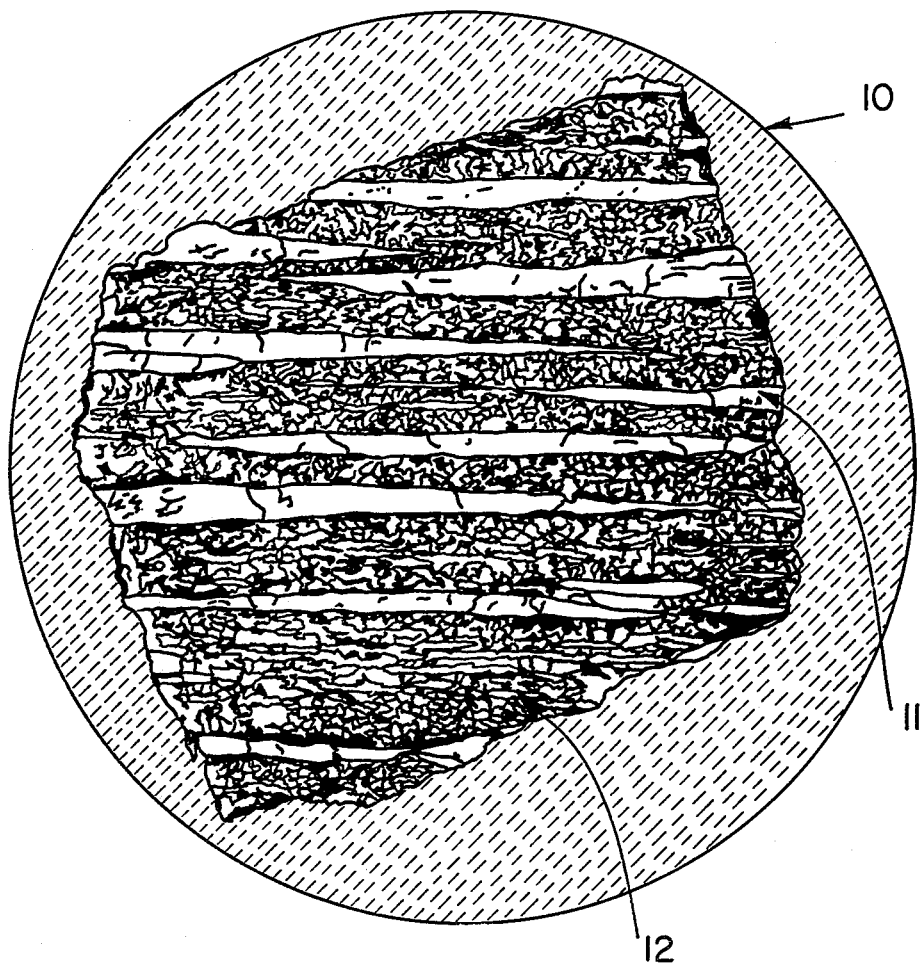

MAGNETIC CATALYSTS AND THEIR PREPARATION

BACKGROUND OF THE INVENTION AND PRIOR ART

It is known that a bed of fluidizable, magnetizable particulate solids can be fluidized and subjected to a magnetic field, and that the cohesive forces produced between the magnetic particles changes the state, and mode of operation of the bed as contrasted with conventional fluidized beds. Such beds are useful for conducting various fluid-solids contacting operations, inclusive particularly of adsorption, absorption, particulate removal and catalytic reactions.

In U.S. Pat. No. 4,115,927 by Ronald E. Rosensweig, which issued Sept. 26, 1978, e.g., there is disclosed a process which utilizes a magnetically stabilized bed. As in a conventional fluidized process a fluid, notably a gas, is injected upwardly through a bed of magnetizable particulate solids to maintain the particles of the bed in a fluidized state, or state wherein the bed has properties much like those of a liquid. In the magnetically stabilized bed process, unlike those using a conventional fluidized bed, there is little, if any, motion exhibited by the particles within the fluidized bed. The formation of bubbles and slugs are virtually eliminated due to the interaction between the fluidized ferromagnetic particles and the magnetic field. The magnetically stabilized bed processes offer advantages over those utilizing conventional fluidized beds in that they provide better counter-current contacting, low gas and solids back mixing, and low particle attrition.

The bed of a magnetically stabilized process is constituted of compositions characterized as admixtures of ferromagnetic particles and non-ferromagnetic particles, or composite particles wherein a plurality of finely divided ferromagnetic inclusions are contained within a matrix material which is in itself usually non-ferromagnetic, e.g., alumina. The composite particles may also contain an incorporated catalytic component, or components, where the composites are to be used for conducting chemical reactions. Such processes have been found to offer particular advantages in certain high temperature applications, notably as fluid bed fly-ash filters, or for use in hydroforming (reforming), hydrogenation reactions, flue gas desulfurization and the like.

Whereas magnetically stabilized bed processes utilizing catalysts containing irregular shaped ferromagnetic inclusions have proven useful in conducting various chemical reactions, notably hydrocarbon conversion reactions, their performance nonetheless falls far short of providing practical, economic commercial gas solid contacting processes. Simply stated, too much energy (and consequently too much cost) is required to maintain an effective magnetic field. Even in the use of a catalyst which contains a high concentration of particles having inclusions with good ferromagnetic properties that may be sufficiently magnetic ab initio to meet borderline economics, the magnetic properties of the catalyst generally fade and grow poorer as the time of the operation is contained and extended. The problem is intensified due to shock, thermal excursions, or the like such that the bed of catalytic particles is gradually demagnetized as the time of operation of the process is extended.

It was also found that dramatic improvements in magnetic susceptibility could be achieved by incorporating elongate magnetic inclusions, at relatively high concentrations, within particulate magnetic composites. In U.S. Application Ser. No. 943,552, by Seiver et al, filed Sept. 18, 1978, now abandoned, e.g., there is disclosed the use in a fluidized magnetically stabilized bed of particulate magnetic compositions wherein the composite particles contain a plurality of elongated ferromagnetic components oriented within a matrix material with their long dimensions essentially parallelly aligned. The composite particles, when subjected to a magnetic field rotate, turn, or line up with the long dimensions of the ferromagnetic components parallel to the direction of the field. In U.S. Application Ser. No. 943,553 by Seiver et al, also filed Sept. 18, 1978, now abandoned, there is disclosed a similar use of particulate compositions wherein the composite particles contain a plurality of elongated ferromagnetic components randomly oriented one with respect to another. In both types of particulate composition the particles are contained within the matrix in concentration ranging from about 0.5 to 50 percent, based on the volume of the particulate composition. A high induced magnetism is obtained in a small applied magnetic field in use of both types of particulate composition, although the particles which contain the elongate ferromagnetic components in parallel orientation produce magnetic susceptabilities higher than the particles having randomly oriented ferromagnetic components. Moreover, in both, accentuating or increasing the length:diameter ratio of the ferromagnetic components also increases the magnetic susceptibility of the finished particulate composites.

Despite these improvements particles which can be more easily manufactured and which have higher efficiencies are nonetheless desirable if the operation of fluidized magnetic processes is to become a commercial reality.

It is, accordingly, a primary objective of the present invention to supply this need and, in particular, to provide the art with a new and improved process for the preparation of magnetic, particulate composites and catalysts having high magnetic susceptibility.

A specific object is to provide a new and improved process of such character for the preparation of particulate, magnetic composites, both catalytic and noncatalytic, which contain oriented elongate iron particles.

A more specific object is to provide a process as characterized wherein the composite particles have good stability in both reducing and oxidizing atmospheres, and are attrition resistant.

These objects and others are achieved in accordance with the practice of the present invention which embodies a particulate composition, and process for the use of such compositions in a magnetic fluidized bed. The composition is comprised of a magnetic iron precursor component characterized as a reduced form of the mineral ilmenite $FeTiO_3$, particularly the natural mineral ilmenite $FeTiO_3$, incorporated within a refractory inorganic oxide particulate mass, notably alumina, silica, silica-alumina, aluminosilicate or precursor thereof which serves as a matrix within which said mineral is dispersed as an inclusion, or inclusions. The ilmenite can be reduced and then incorporated in particulate composite mass. Or, if the ilmenite has not been prereduced, the ilmenite can be incorporated with the particulate composite mass, and the total composite mass then treated in a reducing atmosphere to form oriented, laminar layers of reduced iron metal intimately dispersed throughout said particulate composite mass.

The naturally occurring mineral ilmenite TeTiO$_3$, which usually contains some hematite Fe$_2$O$_3$, is the preferred iron precursor material used for the production of the particulate composites of this invention. Prior to its incorporation with the inorganic oxide, the mineral is ground to small particle size, suitably to particle sizes ranging from about 5 microns to about 150 microns, preferably from about 10 microns to about 44 microns, and then admixed or otherwise incorporated with said inorganic oxide precursor. The mineral is admixed with the precursor component in concentration sufficient to provide an iron content (as metallic iron) ranging from about 30 percent to about 70 percent, preferably from about 40 percent to about 60 percent, based on the dry weight of the composite. The particulate composite mass is then heated in a reducing atmosphere at temperature sufficient to reduce the FeTiO$_3$ to iron metal (and titanium oxide). This generally requires temperatures ranging to about 1700° F., and higher, preferably from about 500° F. to about 1700° F., more preferably from about 1000° F. to about 1500° F. The time of the reduction can vary widely, but generally ranges from about 1 to about 24 hours, preferably from about 4 to about 10 hours. In its natural state the iron species of the ilmenite is present as an intimate dispersion of laminar layers and, when reduced, the resulting iron metal remains dispersed in well oriented laminar layers, the iron retaining a high length:diameter ratio.

The particles of ilmenite can be contained within the composite particles such that the laminar layers of iron are generally randomly aligned, or preferably the laminar layers of iron in the particle can be highly oriented along a linear dimension of a composite particle. In the formation of spheres, beads, pellets or the like a high degree of linear orientation of the iron along a linear dimension of a composite particle can be obtained by utilizing particles of ilmenite which approximate the size of the composite particles formed. In this manner the composite is formed by conventional techniques, with an ilminite particle added, the added ilmenite particle occupying the major volume of the total composite particle volume. Generally, in the formation of spheres, beads, pellets or the like, the size of the particles of ilmenite range from about 20 microns to about 40 microns in average diameter, and the size of the composite particles range from about 50 microns to about 100 microns average diameter. The ilmenite in such composite particle is thus comprised of a large particle within a relatively thin matrix of the non-ilmenite material. In another method of achieving a high degree of laminar orientation along a linear dimension of a composite particle, the ilmenite particles are prereduced, and then are incorporated within a hydrogel, and passed through a magnetic field to orient the particles prior to gellation of the composite particles.

In the reduced natural ilmenite structure, in all embodiments, the reduced iron metal layers are separated by corresponding alternating layers of titanium oxide, which impart superior oxidation resistance to the occluded iron. The titanium oxide layers thus provide protective surfaces for the iron, this being particularly important because the particulate composite mass in chemical processing is usually employed in the presence of materials which are corrosive and highly reactive to iron. Moreover, the iron surfaces are in a sense "passivated" so that the composite can be readily converted to catalysts by further incorporation of a catalytic amount of a catalytic component with said particulate composite mass, without significant loss of the catalytic metal a portion of which normally plates out on the iron, and is thereby rendered catalytically ineffective. Suitably, catalysts are formed from the composites by impregnation of dried, calcined particulate masses of the composite particles with a solution, or solutions, of a compound or salt of the desired catalytic metal, or metals.

The natural ilmenite, or ilmenite-hematite mineral, particulate composite is readily reduced, e.g., in an atmosphere of hydrogen, or a hydrogen-containing gas; though, alternately, the natural ilmenite can be prereduced and then composited with said inorganic oxide precursor to form said particulate composite mass. In either event, essentially the same conditions are applicable for the reduction. In general, the mineral can be reduced at temperatures ranging to about 1700° F., or higher, generally from about 500° F. to about 1700° F., preferably from about 1000° F. to about 1500° F., to reduce up to 95%, or higher, of the iron present in the mineral to metallic iron.

The inorganic oxide portion of the particulate composite mass may, if desired, be incorporated with a catalytic amount of a catalytic component at the time of, or prior to its admixture or incorporation with said ilmenite component. Or, on the other hand, preferably a catalytic amount of a catalytic component can be incorporated with said particulate composite mass after its formation, most preferably by impregnation of the dried, calcined particulate composite mass with a solution, or solutions, which contain a catalytic amount of a compound or salt of the desired catalytic metal, or metals. For example, where the composite is to be used in a flue gas desulfurization process, a catalytic amount of the catalytic metal, or metals, e.g. cerium, can be incorporated with the inorganic oxide precursor component by cogelling catalytically effective amounts of a catalytic metal, or metals, with said component and the cogelled mass then admixed with the desired amount of the ilmenite component. Most preferably however, catalytic metals are added to the particulate composite mass by contact with a solution, or solutions, to incorporate therewith catalytically effective amounts of said metal, or metals. The finished catalyst, in either event, is provided with sufficient of the catalytic metal component to provide the desired amount of metal, or metals, on the composite particles, this of course taking into account the amount of matrix material, calculated on a dry basis, and the amount of the ilmenite inclusions.

The inorganic oxide matrix portion, preferably alumina, is admixed with sufficient of the ilmenite and aluminum oxide precursor to provide finished composite particles which contain from about 0.05 percent to about 50 percent, preferably from about 5 percent to about 40 percent, based on total catalyst volume (dry basis), iron (calculated as metallic iron) in the particles, whether or not the iron is completely reduced. The composite contains generally from about 10 percent to about 80 percent, preferably from about 20 percent to about 60 percent, iron based on the weight of total catalyst (dry basis). In general, the finished composite catalyst contains from about 0.1 percent to about 30 percent, preferably from about 0.5 percent to about 20 percent, of the catalytic metal, or metals component, exclusive of the amount of the iron component.

The particulate composition is applicable for use in a wide variety of fluid-solids contacting processes, inclusive of adsorption, absorption, particulate removal and catalytic processes, supra. In the preparation of catalysts, it becomes essential to add the catalytic metal, or metals, in catalytically active amounts to the particulate inorganic oxide/reduced iron-containing composite. The nature and amount of the added catalytic component is thus determined by the type of process in which the finished catalyst is to be applied. The catalyst is necessarily constituted of composite particles which contain an inorganic oxide matrix material, a sufficient amount of iron as reduced ilmenite to make the composite particles magnetizable, and suitably, a catalytically effective amount of a catalytic metal, or metals component, or components. If, e.g., the catalyst is to be employed as a flue gas desulfurization catalyst it preferably contains as a catalytic component copper or cerium. If it is to be employed as a reforming catalyst, it preferably contains as a catalytic component a Group VIII noble metal, especially platinum, palladium, and the like. In general, copper (as metallic copper) is added to such catalyst in concentration ranging from about 2 percent to about 10 percent, preferably from about 4 percent to about 8 percent; cerium (as $CeO_2$) in concentration ranging from about 5 percent to about 30 percent, preferably from about 10 percent to about 20 percent; and, e.g., platinum (as metallic platinum) in concentration ranging from about 0.01 to about 3 percent, preferably from about 0.03 to about 1 percent; based on the total weight of the composite (dry basis) exclusive of the magnetic component. The inorganic oxide component of the finished catalyst composite is generally present in concentration ranging from about 10 percent to about 55 percent, preferably from about 25 percent to about 40 percent, with from about 20 percent to about 75 percent, preferably from about 30 percent to about 60 percent, of the ilmenite component, based on the total weight of the composite (dry basis), exclusive of the catalytic component.

The matrix material within which the ilmenite is dispersed, and upon which the catalytic component, if any, is dispersed is constituted of a porous, refractory inorganic oxide, preferably alumina, or alumina with one or more additional components. The matrix material can thus be constituted of one or more of alumina, bentonite, clay, diatomaceous earth, zeolite, silica, activated carbon, magnesia, zirconia, thoria, and the like; though the most preferred matrix material is alumina to which, if desired, can be added a suitable amount of other refractory materials such as silica, zirconia, magnesia, titania, and the like, usually in a range of about 1 to 20 percent, based on the weight of the matrix material. A preferred matrix material for the practice of the present invention is one which, on a metals free basis, has a surface area of more than 50 $m^2/g$, preferably from about 100 to about 300 $m^2/g$, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Å.

The particulate catalyst composite, after impregnation, is treated the same, or in essentially the same manner, as a conventional catalyst. It is dried by heating at a temperature above about 85° F., generally between about 150° F. and 300° F., in the presence of nitrogen or oxygen, or both, in a stream of air or under vacuum. The catalyst is calcined at a temperature between about 500° F. and 1200° F., preferably at a temperature ranging from about 250° F. to about 1000° F., either in the presence of oxygen in an air stream, or in the presence of an inert gas such as nitrogen.

A composite particle as constituted of alumina and reduced natural ilmenite, $FeTiO_3$, in cross-section, is depicted by reference to the attached FIGURE.

BRIEF DESCRIPTION OF THE DRAWING

Referring to the FIGURE, there is shown a face of a polished cross-section at 200X magnification of an alumina-natural $FeTiO_3$ ilmenite ore composite as formed from the natural ilmenite and alumina, subsequently reduced at 1500° F. by contact with an admixture of hydrogen in nitrogen. It will be observed that the reduced iron portion of the ilmenite particle 10 is characterized by the presence of substantially parallel layers 11 of reduced iron dispersed between alternating layers 12 of titanium oxide, $TiO_3$.

The invention will be more fully understood by reference to the following simulated data illustrating its more salient features. All parts are given in terms of weight except as otherwise specified.

EXAMPLE

A column 53 inches in length and 2.125 inches in diameter is filled with Primol 355 (oil) and surrounded by an electromagnet having a field of 500 oersteds. A heated collection column is employed at the bottom of the column to collect the beads.

A standard gelation run is made by first preparing an aluminum hydroxy chloride solution from 1600 gms $Al_2(OH)_5Cl.2H_2O$ and 2336 cc of distilled water. A hexamethylene tetramine solution is prepared by dissolving 531.2 gms of $(CH_2)_6N_4$ in 1149 cc of ether. The two solutions are then mixed in a blender with sufficient natural ilmenite, $FeTiO_3$, prereduced in hydrogen at 1500° F. for five hours to provide 194 gms of equivalent iron and a few drops of a surfactant to enhance wetting the prereduced ilmenite.

The slurry is placed in a small stirred vessel above the oil column. It is transferred from the vessel to a dropping nozzle and into the oil column by a small nitrogen pressure (ca. 5 psig), the distance between the nozzle and the surface of the oil being adjusted so that the droplet spray cone can strike the oil surface rather than the walls of the column. Oil temperature is maintained between 180° F. and 190° F.

The orienting solenoid is 17 13/16 inches in length with a base of 7¾ inches. It is placed so that the upper end of the solenoid is near the top of the oil surface. The applied field is sufficient to disperse and orient the long sides of the stainless steel particles in a generally linear relationship one particle relative to another.

The beads form in the hot oil of the column, and thereafter are aged for 72 hours in the same oil at 190° F. They are then worked free of the oil with "Varsol", and the "Varsol" washed from the beads with isopropyl alcohol; the alcohol being removed with a water wash. The washed beads are then aged 16 hrs. at room temperature in an ammonia solution containing 52.2 gms $NH_3$ per liter of solution. The ammonia aged beads are then water washed and dried at 190° F. in a circulating hot air oven. The dried beads are then calcined at 1000° F. and; if desired, can be impregnated with a catalytic metal or metals, to form a catalyst.

It is apparent that various modifications and changes can be made in the conditions of treatment, nature and quantity of the metals loadings, the matrix material and the like without departing the spirit and scope of the invention.

Having described the invention, what is claimed is:

1. A composition of matter useful in a bed which can be fluidized by contact with a fluidizing medium while simultaneously subjected to an applied magnetic field comprising, particulate, magnetizable composite solid particles comprised of an ilmenite magnetic iron component dispersed within an inorganic oxide matrix, the iron component of the ilmenite being comprised of from about 0.05 percent to about 50 volume percent metallic iron in reduced state.

2. The composition of claim 1 wherein the ilmenite component of the particulate composition is natural ilmenite in reduced state.

3. The composition of claim 1 wherein a catalytic amount of a catalytic metal component is incorporated with said particulate composition.

4. The composition of claim 3 wherein the catalytic metal component is a Group I-B or Group VIII noble metal hydrogenation-dehydrogenation component.

5. The composition of claim 3 wherein the catalytic metal is a Group I-B or Group VIII noble metal hydrogenation-dehydrogenation component, the inorganic oxide is alumina, and the ilmenite component is the natural ilmenite mineral in a substantially reduced state.

6. The composition of claim 5 wherein the ilmenite mineral also contains hematite.

7. The composition of claim 3 wherein the catalytic metal is a Group I-B or Group VIII noble metal hydrogenation-dehydrogenation component, the inorganic oxide is alumina, the ilmenite component is the natural ilmenite mineral in a substantially reduced state, the ilmenite mineral contains hematite, and the metallic iron layers are present as laminar layers separated by corresponding layers of titanium oxide.

8. A process for the preparation of particulate, magnetizable solids particles for use in a bed which can be fluidized by contact with a fluidizing medium while simultaneously subjected to an applied magnetic field which comprises
admixing a particulate inorganic oxide gel with a magnetic iron precursor component, comprised of ilmenite $FeTiO_3$ to form a particulate composite mass within which said magnetic particles are dispersed as inclusions within the inorganic oxide which serves as a matrix.

9. The process of claim 8 wherein the particulate composite particles are exposed to a reducing atmosphere.

10. The process of claim 9 wherein the particulate particles are exposed to the reducing atmosphere at temperatures ranging from about 500° F. to about 1700° F.

11. The process of claim 9 wherein the particulate composite particles are exposed to the reducing atmosphere at temperatures ranging from about 1000° F. to about 1500° F.

12. The process of claim 9 wherein a catalytic amount of a catalytic metal component is incorporated with said particulate composite particles.

13. The process of claim 12 wherein a Group I-B or Group VIII noble metal hydrogenation-dehydrogenation component is incorporated with said particulate composite particles.

14. The process of claim 9 wherein the catalytic metal is a Group I-B or Group VIII noble metal hydrogenation-dehydrogenation component, the inorganic oxide is alumina, and the ilmenite component is the natural ilmenite mineral in a substantially reduced state.

15. The process of claim 14 wherein the catalytic metal is a Group I-B or Group VIII noble metal hydrogenation-dehydrogenation component the inorganic oxide is alumina, the ilmenite component is the natural ilmenite mineral in a substantially reduced state, the ilmenite mineral contains hematite, and the metallic iron layers are present as laminar layers separated by corresponding layers of titanium oxide.

* * * * *